(12) United States Patent
Abrahams et al.

(10) Patent No.: US 7,752,322 B2
(45) Date of Patent: Jul. 6, 2010

(54) SYSTEM FOR UBIQUITOUS NETWORK PRESENCE AND ACCESS WITHOUT COOKIES

(75) Inventors: Marc David Abrahams, San Diego, CA (US); Seda Gragossian, Encinitas, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1117 days.

(21) Appl. No.: 10/805,170

(22) Filed: Mar. 19, 2004
(Under 37 CFR 1.47)

(65) Prior Publication Data
US 2005/0210135 A1  Sep. 22, 2005

(51) Int. Cl.
*G06F 15/16* (2006.01)
(52) U.S. Cl. .................. 709/229; 709/219
(58) Field of Classification Search .............. 709/229, 709/225, 226
See application file for complete search history.

(56) References Cited

U.S. PATENT DOCUMENTS

| | | | |
|---|---|---|---|
| 5,560,008 A | 9/1996 | Johnson et al. | |
| 5,678,041 A * | 10/1997 | Baker et al. | 707/9 |
| 5,689,638 A | 11/1997 | Sadovsky | |
| 5,764,915 A * | 6/1998 | Heimsoth et al. | 709/227 |
| 5,774,670 A | 6/1998 | Montulli | |
| 5,790,785 A | 8/1998 | Klug et al. | |
| 5,908,469 A | 6/1999 | Botz et al. | |
| 6,041,357 A * | 3/2000 | Kunzelman et al. | 709/228 |
| 6,092,196 A | 7/2000 | Reische | |
| 6,205,480 B1 * | 3/2001 | Broadhurst et al. | 709/225 |
| 6,226,752 B1 | 5/2001 | Gupta et al. | |
| 6,324,648 B1 * | 11/2001 | Grantges, Jr. | 726/12 |
| 6,339,423 B1 | 1/2002 | Sampson et al. | |
| 6,353,849 B1 | 3/2002 | Linsk | |
| 6,539,494 B1 * | 3/2003 | Abramson et al. | 714/4 |
| 6,587,880 B1 * | 7/2003 | Saigo et al. | 709/225 |
| 6,751,654 B2 * | 6/2004 | Massarani et al. | 709/219 |
| 6,760,441 B1 * | 7/2004 | Ellison et al. | 380/45 |
| 7,093,019 B1 * | 8/2006 | Bertani et al. | 709/229 |
| 7,188,183 B1 * | 3/2007 | Paul et al. | 709/229 |
| 7,269,624 B1 * | 9/2007 | Malik | 709/206 |
| 2001/0044894 A1 * | 11/2001 | Saito et al. | 713/156 |
| 2002/0010776 A1 * | 1/2002 | Lerner | 709/225 |
| 2002/0184539 A1 * | 12/2002 | Fukuda et al. | 713/202 |
| 2002/0188508 A1 * | 12/2002 | Lee et al. | 705/14 |
| 2003/0172164 A1 * | 9/2003 | Coughlin | 709/227 |
| 2003/0177388 A1 * | 9/2003 | Botz et al. | 713/201 |
| 2004/0010697 A1 * | 1/2004 | White | 713/186 |
| 2004/0181598 A1 * | 9/2004 | Paya et al. | 709/227 |
| 2005/0015601 A1 * | 1/2005 | Tabi | 713/182 |
| 2005/0039008 A1 * | 2/2005 | Bhatia et al. | 713/170 |

\* cited by examiner

*Primary Examiner*—Moustafa M Meky
*Assistant Examiner*—Ho Shiu
(74) *Attorney, Agent, or Firm*—Fitch, Even, Tabin & Flannery

(57) ABSTRACT

A system for ubiquitous network presence and access without cookies utilizes a unique customer ID that is created for a customer using a client device connected to the Internet and is stored on the device and by other server applications for future automatic authentication and login of the customer when accessing the variety of services available on a business network.

18 Claims, 2 Drawing Sheets

SYSTEM FOR UBIQUITOUS NETWORK PRESENCE AND ACCESS WITHOUT COOKIES

BACKGROUND OF THE INVENTION

The present invention relates generally to computer network access, and more particularly to ubiquitous network presence.

As the variety of devices capable of Internet access continues to grow so do the number of such devices that do not run conventional World Wide Web (Web) browsers, or any browser at all. This causes a more difficult problem in providing methods for ubiquitous login to users of such devices. Currently, most methods utilize setting cookies in the Web browser of the device. These cookies (files that are stored on a user's computer by a web site and that can identify a return visit) are automatically sent to servers the user encounters giving the single login effect. If the device cannot manage cookie methods of identification, they cannot have the single login effect.

There is thus a need in the art for a system for ubiquitous network presence that does not require utilization of cookies for devices that cannot manage cookie methods of identification.

SUMMARY OF THE INVENTION

The present invention advantageously addresses the needs above as well as other needs by providing a system for ubiquitous network presence that does not require utilization of cookies for devices that cannot manage cookie methods of identification.

In one embodiment, the invention can be characterized as a method for computer network access comprising the steps of communicating user information to a first server from a client, storing user information on the first server, creating a unique identification for the user, storing the unique identification on the first server, communicating the unique identification to the client and other servers, storing the unique identification on the client and other servers, and matching the unique identification stored on the client to that stored either on the first or other servers when the user correspondingly communicates with either the first or other servers.

In another embodiment, the invention can be characterized as a computer network system comprising a server computer running a server software application operable for creating a unique identification for a user, storing the unique identification on the server computer, communicating the unique identification to a client and authenticating the user via the unique identification when the user communicates with the server computer. The system also comprises a client computer running a client software application, said client computer operably connected to the server computer over a network and wherein the client software application is operable for communicating user information to the server application software from the client computer, storing user information on the client computer, and performing the user authentication with the server application.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
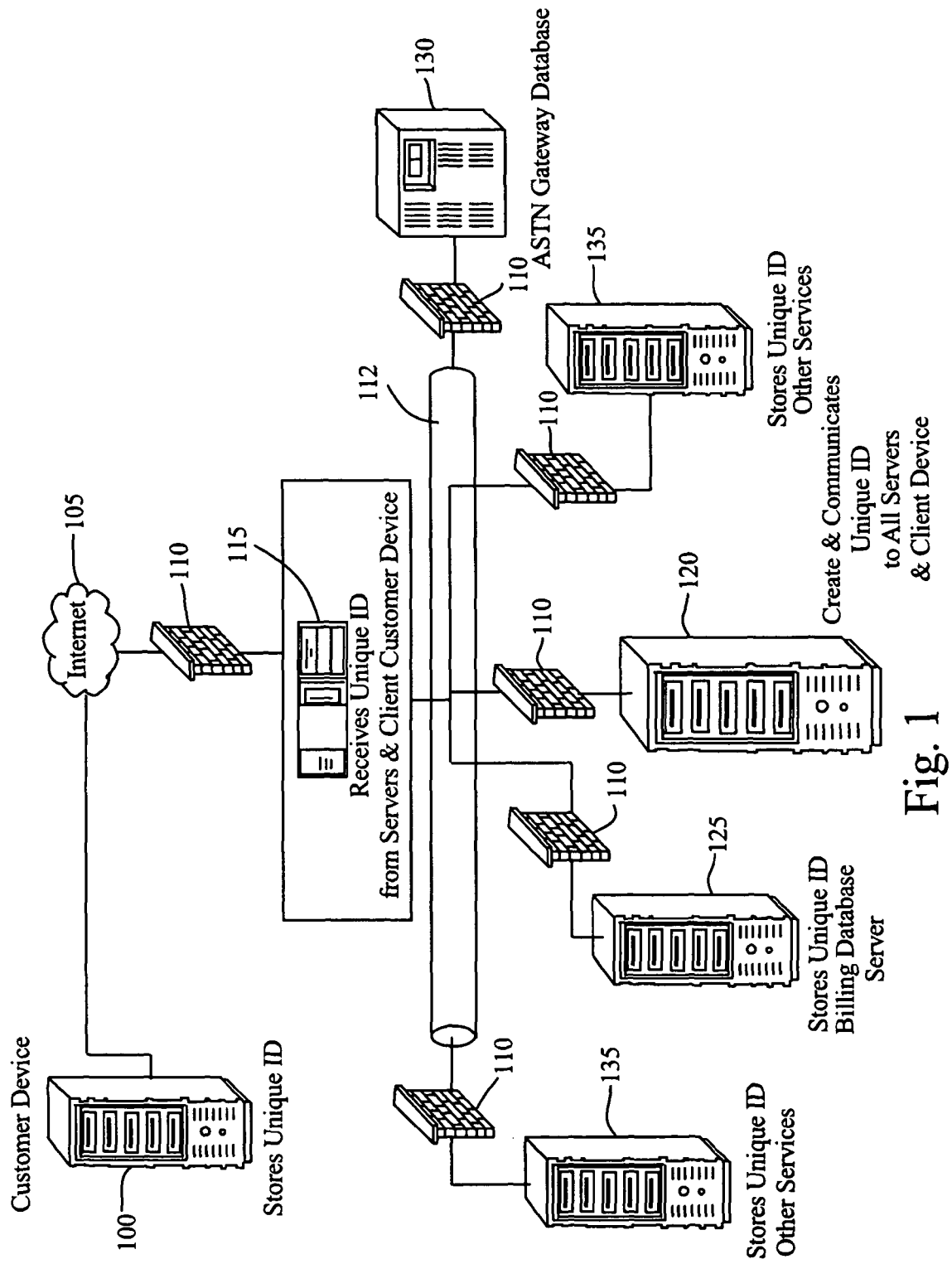
FIG. 1 is a diagram of the system architecture of a network according to an embodiment of the present invention.

Referring to FIG. 1, shown is a diagram of the system architecture of a network according to an embodiment of the present invention.

Shown is a customer device 100, the Internet 105, firewalls 110, a business network communication link 112, a registration server 115, a back-end server 120, a billing database server 125, a public switched telephone network (PSTN) Gateway database 130, and other database servers 135.

The customer device 100 is connected through the Internet 105 to the front end registration server 115 (preferably through a firewall 110). The customer device may include any electronic device that has digital communications capability such as a computer, cell phone, personal digital assistant or television, for example. The front end registration server 115 is linked to a business network including the back-end server 120, the billing database server 125, the PSTN Gateway database 130 and other database servers 135 through the business network communication link 112. Each node in the business network preferably requires access through network firewall protection 110.

A client side application runs on the customer device 100 and functions to control an amount of set up data stored on any customer device 100. The client application, instead of a web browser, provides a connection to networked services available on the business network. This client application runs on the customer device 100 in the background to perform authentication with the services the customer accesses through the database servers 125, 130, 135 with the customer device 100.

When a customer initially registers with a web site they enter their customer information such as their address and phone number, for example. This can be done via any variety of input devices such as a keyboard, mouse, remote control, touchscreen or voice recognition technology to name a few. The back end server 120 accepts that information 210 via common gateway interface (CGI) standard. CGI is a standard for interfacing external applications with information servers, such as Hypertext Transfer Protocol (HTTP) or World Wide Web servers. Here, the external application is that running on the customer device 100 and the information server is the back end server 120. Berkeley System Distribution (BSD) socket interface (socket), JAVA servlet technology (servlet) or other suitable interfaces may also be used. The customer's information is then stored on the back end server 120 in a database. The server application running on the back end server 120 then creates a unique customer ID for the customer by using a random number generator, for example, and stores it in the database. This unique customer ID is communicated via the Internet from the server application to the client application on the customer device 100 and preferably stored in non-volatile memory on the customer device 100.

The server application also communicates this customer ID and any other necessary customer information 230 via the business network to all server applications of services that are provided by the business network including those running on the other servers 125, 130, 135 on the business network. This network communication may be done through a variety of means such as CGI, servlet or socket, for example, and may be formatted in Extensible Markup Language (XML), custom format, or other suitable means. The server application for the particular service the customer is attempting to access then authenticates the user via the unique customer ID by matching the unique customer ID communicated by the client application to the server application with that unique ID stored on the server's database (say server 125 for example in FIG. 1). The user is then logged on to access the requested services.

When the customer subsequently attempts to access services on the business network the customer will have a unique ID that was created during the initial log on, and again the server application for the particular service the customer is attempting to access will automatically authenticate the user via the unique customer ID from the client by matching it with that unique ID stored on the server's database. This provides ubiquitous presence on the business network for the customer for whatever services they desire to access without the use of cookies.

Figure 2:
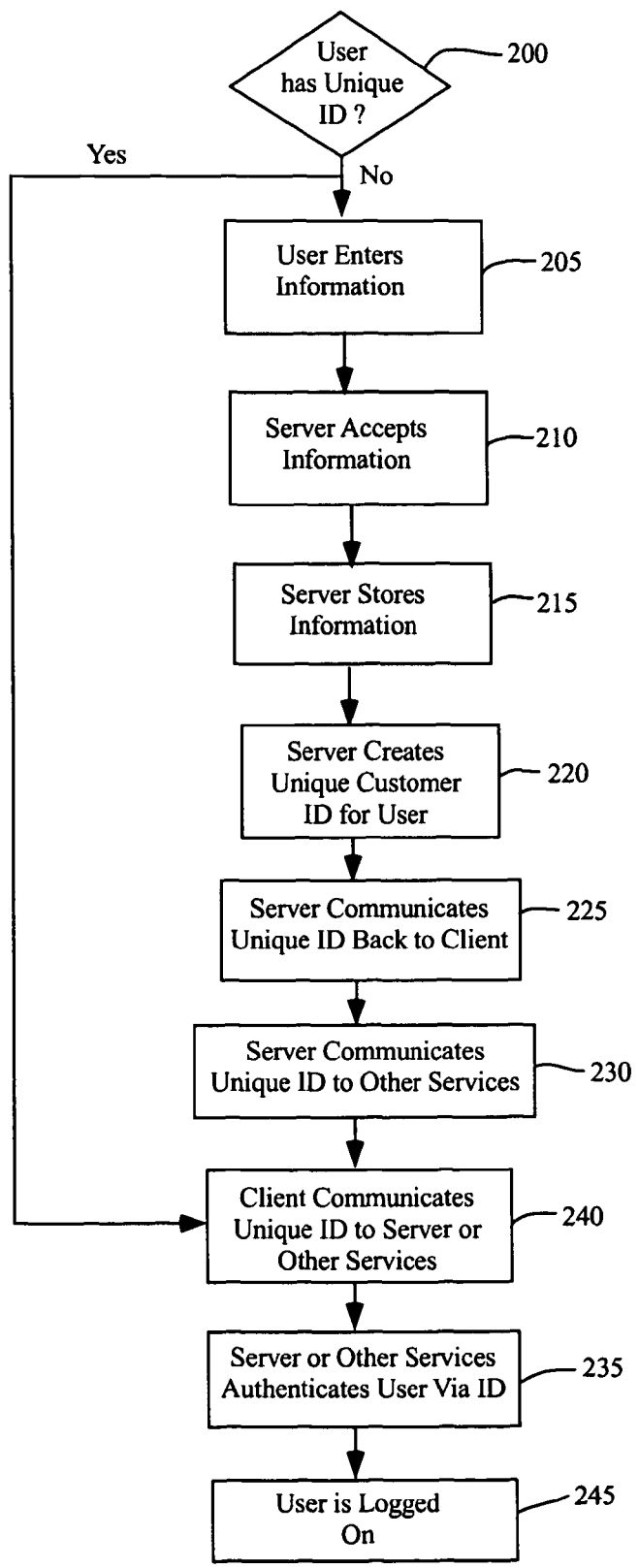
FIG. 2 is a chart displaying a process according to an embodiment of the present invention.

Referring next to FIG. 2, shown is a chart displaying a process according to an embodiment of the present invention.

When a customer initially registers with a web site they do not have a unique customer ID 200 and they enter their customer information 205 such as their address and phone number, for example. This can be done via any variety of input devices such as a keyboard, mouse, remote control, touch-screen or voice recognition technology to name a few. The back end server 120 accepts that information 210 via a common gateway interface (CGI) standard. CGI is a standard for interfacing external applications with information servers, such as Hypertext Transfer Protocol (HTTP) or World Wide Web servers. Here, the external application is that running on the customer device 100 and the information server is the back end server 120. Berkeley System Distribution (BSD) socket interface (socket), JAVA servlet technology (servlet) or other suitable interfaces may also be used. The customer's information is then stored 215 on the back end server 120 in a database. The server application running on the back end server 120 then creates a unique customer ID 220 for the customer by using a random number generator, for example, and stores it in the database. This unique customer ID is communicated via the Internet from the server application to the client application on the customer device 100 and preferably stored in non-volatile memory on the customer device 100. The server application also communicates this customer ID and any other necessary customer information 230 via the business network to all server applications of services that are provided by the business network including those running on the other servers 125, 130, 135 on the business network. This network communication may be done through a variety of means such as CGI, servlet or socket, for example, and may be formatted in Extensible Markup Language (XML), custom format, or other suitable means. The server application for the particular service the customer is attempting to access then authenticates 235 the user via the unique customer ID by matching the unique customer ID communicated 240 by the client application to the server application with that unique ID stored on the server's database (say server 125 for example in FIG. 1). The user is then logged on 245 to access the requested services.

When the customer subsequently attempts to access services on the business network the customer will have a unique ID 200 that was created during the initial log on, and again the server application for the particular service the customer is attempting to access will automatically authenticate 235 the user via the unique customer ID from the client 240 by matching it with that unique ID stored on the server's database. This provides ubiquitous presence on the business network for the customer for whatever services they desire to access without the use of cookies. This process may be useful for automatically tracking customer usage of services without requiring interaction from the customer such as for billing, customer locating, customer preferences and other purposes.

While the invention herein disclosed has been described by means of specific embodiments and applications thereof, numerous modifications and variations could be made thereto by those skilled in the art without departing from the scope of the invention set forth in the claims.

What is claimed is:

1. A method for computer network access, comprising the steps of:

running a client application, wherein the client application is not a web browser, and wherein the client application runs on a customer device incapable of managing a cookie;

entering user information into the customer device;

communicating the entered user information to a first server;

storing the user information on the first server;

creating a unique customer identification for a user of the customer device, wherein the creating step comprises generating a random number;

storing the unique customer identification on the first server;

communicating the unique customer identification to the customer device running the client application and to a plurality of other servers running a plurality of server applications, thereby providing a unique customer identification communication, lacking a cookie, wherein the unique customer identification communication is sent to the customer device and to the plurality of other servers;

storing the unique customer identification on the customer device and on the plurality of other servers, thereby providing a stored unique customer identification;

communicating the unique customer identification from the customer device to at least one server selected from a group consisting essentially of the first server and the plurality of other servers; and authenticating the user by matching the unique customer identification received by the at least one server with the unique customer identification stored on the at least one server, thereby providing a ubiquitous presence on a network for facilitating provision of a service to the user.

2. The method of claim 1, wherein the authenticating step comprises:

providing a particular service to the user; and prohibiting the user from accessing the service if the unique customer identification received by the at least one server does not match the stored unique customer identification.

3. The method of claim 1, wherein the creating step comprises generating a random number.

4. The method of claim 1, wherein the unique customer identification communicating step comprises forgoing embedding a cookie.

5. The method of claim 1, wherein the unique customer identification communicating step comprises forgoing transmitting a cookie.

6. The method of claim 1, wherein the entered user information communicating step comprises transmitting an address and a phone number.

7. The method of claim 1, wherein the customer device comprises at least one electronic device selected from a group consisting essentially of a device capable of digital communication, a computer, a cellular phone, a personal digital assistant, and a television.

8. The method of claim 1, wherein the entered user information communicating step comprises using at least one technique selected from a group consisting essentially of a common gateway interface standard, a JAVA servlet technology, and a Berkeley System Distribution socket interface.

9. The method of claim 1, wherein the unique customer identification communicating step comprises using at least one technique selected from a group consisting essentially of a common gateway interface standard, a JAVA servlet technology, a Berkeley System Distribution socket interface, an extensible mark-up language, and a custom format.

10. A computer network system, comprising:
a server computer running a server software application operable to create a unique customer identification for a user, store the unique identification on the server computer, communicate the unique customer identification, lacking a cookie, to a client computer, wherein the unique customer identification communication, lacking a cookie, is sent to the client computer and to the server computer, and authenticate the user via the unique customer identification when the user communicates with the server computer;
a client computer, incapable of managing a cookie, running a client software application, said client computer being operably connected to the server computer over a network, wherein the client application is not a web browser, and wherein the client software application is operable to communicate user information to the server software application, store the unique customer identification, and provide the server with the unique customer identification to authenticate the user with the server application; and
at least one additional server computer running an additional server software application, said at least one additional server computer being operably connected to the server computer and client computer over a network, being operable to provide information services to the user, and being operable to receive the unique customer identification from the server computer and, being operable to authenticate the user via the unique customer identification when the user communicates with the at least one additional server software application,
whereby a ubiquitous presence on a network is provided for facilitating provision of a service to the user.

11. The system of claim 10, further comprising at least one additional server software application, running on the server computer, being operable to provide a plurality of information services to the user, being operable to receive the unique customer identification from the server computer, and being operable to authenticate the user via the unique customer identification when the user communicates with the at least one additional server software application.

12. The system of claim 10, wherein the client software application forgoes storing a cookie.

13. The system of claim 10, wherein the at least one additional server computer is operably connected to the server computer through a business network.

14. The system of claim 13, further comprising a firewall disposed between the one server computer and the client computer.

15. A digital computer system, comprising:
a computer program embodied in a non-transitory, computer-readable storage medium and adapted to:
run a client application, wherein the client application is not a web browser, and wherein the client application runs on a customer device incapable of managing a cookie;
receive user information entered into the customer device;
communicate the entered user information to a first server;
store the user information on the first server;
create a unique customer identification for a user of the customer device;
store the unique customer identification on the first server;
communicate the unique customer identification to the customer device running the client application and to a plurality of other servers running a plurality of server applications, whereby a unique customer identification communication is provided, wherein the communication, lacking a cookie, is sent to the customer device and to the plurality of other servers;
store the unique customer identification on the client and the plurality of other servers, whereby a stored unique customer identification is provided;
communicate the unique customer identification from the customer device to at least one server selected from a group consisting essentially of the first server and the plurality of other servers; and
authenticate the user by matching the unique customer identification received by the at least one server with the unique customer identification stored on the at least one server,
wherein each server of the plurality of other servers provides a particular service available to the user of the customer device,
wherein the user is prohibited from accessing the service if the unique customer identification received by the at least one server does not match the unique customer identification stored on the at least one server, and
whereby a ubiquitous presence on a network is provided for facilitating provision of a service to the user.

16. The system of claim 15, wherein the customer device comprises at least one electronic device selected from a group consisting essentially of a device capable of digital communication, a computer, a cellular phone, a personal digital assistant, and a television.

17. The system of claim 15, wherein the user information is entered by way of at least one element selected from a group consisting essentially of a keyboard, a mouse, a remote control, a touchpad, and means for recognizing a voice.

18. A non-transitory, tangible computer-readable storage medium, comprising:
a computer program adapted to:
run a client application, wherein the client application is not a web browser, and wherein the client application runs on a customer device incapable of managing a cookie;

receive user information entered into the customer device;

communicate the entered user information to a first server;

store the user information on the first server;

create a unique customer identification for a user of the customer device;

store the unique customer identification on the first server;

communicate the unique customer identification to the customer device running the client application and to a plurality of other servers running a plurality of server applications, whereby a unique customer identification communication, lacking a cookie is provided, wherein the communication is sent to the customer device and to the plurality of other servers;

store the unique customer identification on the customer device and the plurality of other servers;

communicate the unique customer identification from the client to at least one server selected from a group consisting essentially of the first server and one other server of the plurality of other servers; and authenticate the user by matching the unique customer identification received by the at least one server with the unique customer identification stored on the at least one server, wherein each server of the plurality of other servers provides a particular service available to the user of the customer device, wherein the user is prohibited from accessing the service if the unique customer identification received by the at least one server does not match the unique customer identification stored on the at least one server, and whereby a ubiquitous presence on a network is provided for facilitating provision of a service to the user.

\* \* \* \* \*

UNITED STATES PATENT AND TRADEMARK OFFICE
CERTIFICATE OF CORRECTION

| | | |
|---|---|---|
| PATENT NO. | : 7,752,322 B2 | Page 1 of 1 |
| APPLICATION NO. | : 10/805170 | |
| DATED | : July 6, 2010 | |
| INVENTOR(S) | : Abrahams et al. | |

It is certified that error appears in the above-identified patent and that said Letters Patent is hereby corrected as shown below:

In the CLAIMS:
Claim 18, column 7, line 16, after "cookie" insert --,--.

Signed and Sealed this

Fifth Day of October, 2010

David J. Kappos
*Director of the United States Patent and Trademark Office*